Sept. 3, 1929.  F. H. ORDIDGE ET AL  1,727,077
LANDING GEAR FOR AIRCRAFT
Filed Oct. 16, 1928  2 Sheets-Sheet 1
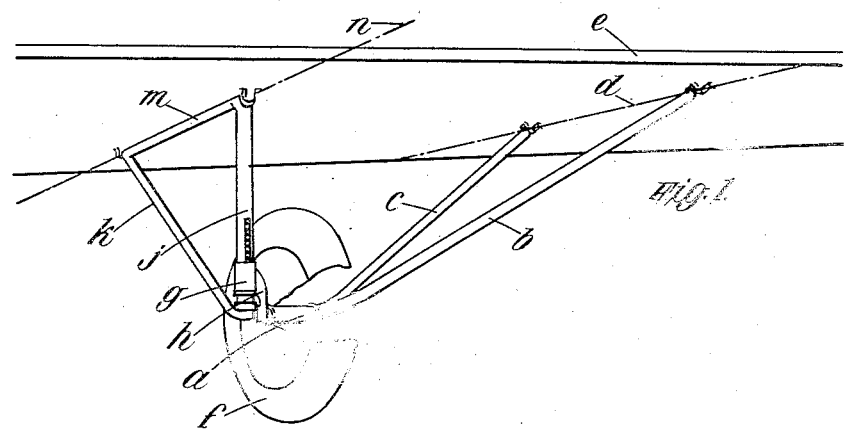
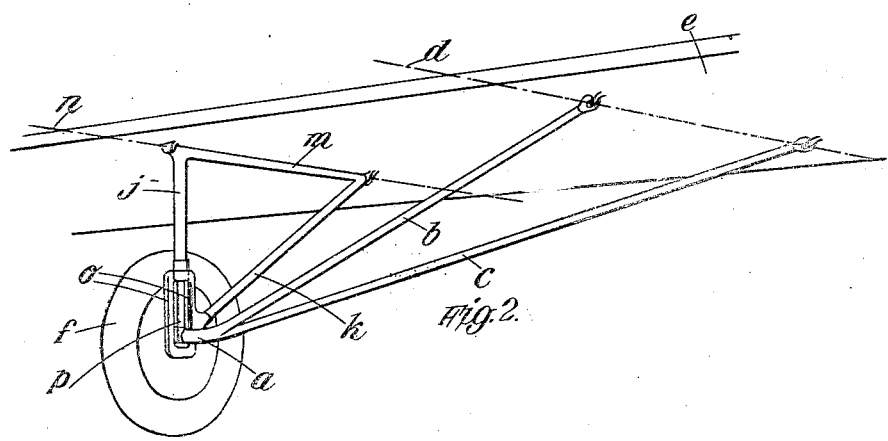
Inventors:
F. H. Ordidge and
D. L. H. Williams,
Att'y.

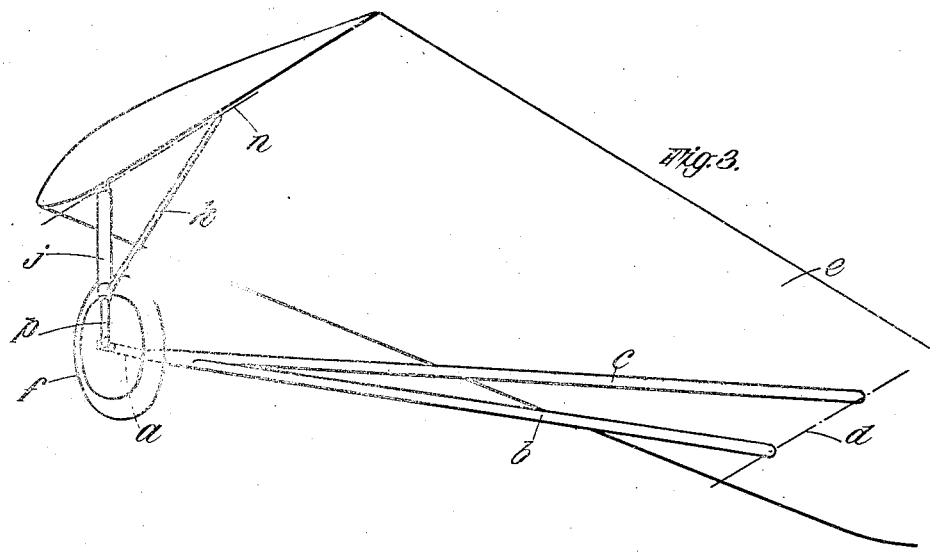
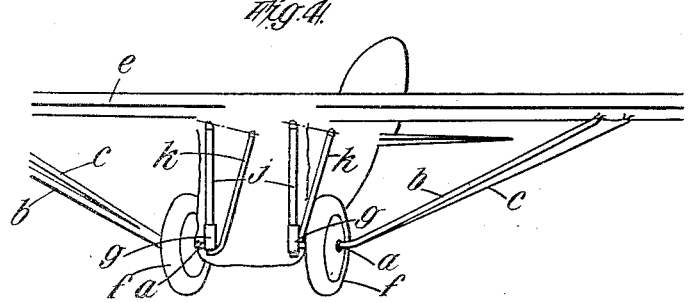

Patented Sept. 3, 1929.

1,727,077

UNITED STATES PATENT OFFICE.

FRANK HENRY ORDIDGE, OF RUISLIP, AND DAVID LEONARD HOLLIS WILLIAMS, OF ICKENHAM, ENGLAND, ASSIGNORS TO CHARLES RICHARD FAIREY, OF HAYES, ENGLAND.

LANDING GEAR FOR AIRCRAFT.

Application filed October 16, 1928, Serial No. 312,861, and in Great Britain November 24, 1927.

This invention relates to the landing gear of aircraft, and has for its object to provide a chassis or frame for landing wheels or the like whereby the torsonal stresses, particularly of a cantilever wing, may be transmitted from a part towards the tip of the wing, where the torsonal strength is least, to the root of the wing where the torsonal strength is greatest. To this end, and in accordance with the invention, a landing wheel, skid or the like is mounted upon the lower end of a strut which is disposed in an inclined position relatively to the wing of the aircraft, the upper end of said strut being pivoted to the underside of said wing, towards the tip thereof, on a substantially fore and aft axis, said strut being pivoted at points towards the front and rear edges of the wing, respectively, whilst its lower end is connected with that of a similar strut which is disposed in a plane substantially at right angles to the under side of the wing, and at the root thereof, the upper end of said second strut being pivoted relatively to said wing, on a substantially fore and aft axis, at points towards the front and rear edges of the wing, respectively. In this manner any torsional stress tending to displace the first mentioned axis is transmitted through the two struts to the root of the wing which is better adapted to resist such stress.

In the accompanying drawings, which illustrate different forms of the invention, Figure 1 is a perspective view of a portion of the wing of an aeroplane and part of its landing gear according to one form of the invention; Figures 2 and 3 are corresponding views showing a second and a third form of the invention, respectively; whilst Figure 4 is a fragmentary perspective view showing the struts of this invention extending towards either side of an aeroplane.

As shown in Figure 1, a substantially Y-shaped strut $a\ b\ c$ is pivoted on a fore and aft axis $d$ by the free ends of its similar and divergent limbs $b\ c$ to the spars (not shown) of an aeroplane wing $e$ at the underside and towards the tip thereof. The central limb $a$ of the Y-shaped strut $a\ b\ c$ constitutes a short axle on which a landing wheel $f$ is revolubly mounted, the free end of said axle being connected by a sleeve $g$ having an offset arm $h$ with that of the piston (not shown) of a spring buffer, the cylinder $j$ of which is disposed vertically and constitutes one side of a right angled triangular strut $j\ k\ m$ the base $m$ of which is pivoted on a fore and aft axis $n$ to the spars of said wing $e$ at the root thereof. Thus the Y-shaped strut $a\ b\ c$ is inclined to the plane of the wing $e$, its central limb $a$ being horizontal and, in flight, torsional stress at the tip of the wing $e$ will be transmitted to the root thereof, whilst, on landing, the struts $a\ b\ c$ and $j\ k\ m$ are free to turn about their pivotal axes $d$ and $n$, respectively when the elements of the spring buffer are telescoped. As shown in Figure 1 the cylinder $j$ is slotted longitudinally to give passage to a pin or like connection between the sleeve $g$ and the piston of the spring buffer.

If desired, the cylinder $j$ of the buffer may be formed with a forked or slotted guide $o$ to receive the central limb $a$ of the Y-shaped strut $a\ b\ c$, as shown in Figure 2 and the inclined side $k$ of the right angled triangular strut $j\ k\ m$ may be secured to one limb of said guide $o$. In this case an hydraulic buffer may be employed and the limb $a$ connected with its piston $p$ and it will be obvious that an hydraulic buffer may be substituted for the spring buffer shown in Figure 1.

According to the modification shown in Figure 3, the base member $m$ is omitted from the right angled triangular strut $j\ k\ m$ and the upper ends of the two other limbs $j\ m$ are pivoted directly to the spars of the wing $e$.

In this case the central limb $a$ of the Y-shaped strut $a\ b\ c$ is connected directly with the piston $p$ of the hydraulic buffer and the side $k$ of the right angled triangular strut $j\ k\ m$ is secured to the lower end of the cylinder $j$ of said buffer.

We claim:—

1. Landing gear for aircraft, wherein a landing wheel, skid or the like is mounted upon the lower end of a strut which is disposed in an inclined position relatively to the wing of the aircraft, the upper end of said strut being pivoted to the underside of said wing, towards the tip thereof, on a substantially fore and aft axis, said strut being pivoted at points towards the front and rear edges of the wing, respectively, whilst its lower end is connected with that of a similar strut which is disposed in a plane substantially at right angles to the under side of the wing, and at the root thereof, the upper end of said second strut being pivoted relatively to said wing, on a substantially fore and aft axis, at points towards the front and rear edges of the wing, respectively.

2. Landing gear for aircraft, as claimed in claim 1, wherein the second strut is of right angled triangular form, the upright side of which constitutes part of a spring, hydraulic or similar buffer.

3. Landing gear for aircraft, as claimed in claim 1, wherein the first strut is substantially Y-shaped, the central limb constituting an axle for a landing wheel, or a point of attachment for a skid or the like.

4. Landing gear for aircraft, as claimed in claim 1, wherein the second strut is of right angled triangular form, the upright side of which constitutes part of a spring, hydraulic or similar buffer, and wherein the first strut is substantially Y-shaped, the central limb constituting an axle for a landing wheel or a point of attachment for a skid or the like.

FRANK HENRY ORDIDGE.
DAVID LEONARD HOLLIS WILLIAMS.